310-322

7/22/86 XR 4,602,245 SR

United States Patent [19]

Yang et al.

[11] Patent Number: 4,602,245

[45] Date of Patent: Jul. 22, 1986

[54] GENERAL PURPOSE MODULAR ACOUSTIC SIGNAL GENERATOR

[75] Inventors: Ta-Lun Yang, Rockville, Md.; Paul Broome, Luray, Va.

[73] Assignee: Ensco, Inc., Springfield, Va.

[21] Appl. No.: 490,024

[22] Filed: Apr. 29, 1983

[51] Int. Cl.[4] .......................... G08B 3/00; H02N 1/04; H04R 15/00

[52] U.S. Cl. ................................ 340/384 R; 310/322; 310/324; 179/110 A

[58] Field of Search ........................ 340/384 R, 384 E; 310/322, 324; 179/110 A, 115 R, 115 V, 115 A; 181/144, 145, 190, 160, 159, 132; 455/349, 350

[56] References Cited

U.S. PATENT DOCUMENTS

| | | | |
|---|---|---|---|
| 2,444,620 | 7/1948 | Williams et al. . | |
| 2,832,843 | 4/1958 | Miessner . | |
| 3,418,437 | 12/1968 | Hoffmann | 181/160 |
| 3,464,057 | 8/1969 | Hayner et al. . | |
| 3,938,141 | 2/1976 | Neuhof | 340/384 R |
| 4,413,198 | 11/1983 | Bost | 310/324 |
| 4,490,640 | 12/1984 | Honda | 310/322 |

*Primary Examiner*—John W. Caldwell, Sr.
*Assistant Examiner*—Tyrone Queen
*Attorney, Agent, or Firm*—Sixbey, Friedman & Leedom

[57] ABSTRACT

A general purpose modular acoustic signal generator includes an outer casing unit having a plurality of disengageably connected sections and an insert unit removably positioned in that outer casing unit. The insert unit has a piezoelectric acoustic generator disc mounted thereon and defines a Helmholtz resonator on each side of the acoustic generator disc. A single outer casing is usable with a plurality of different insert units so a single outer casing unit can be associated with a plurality of different Helmholtz resonators.

15 Claims, 4 Drawing Figures

GENERAL PURPOSE MODULAR ACOUSTIC SIGNAL GENERATOR

TECHNICAL FIELD

The present invention relates, in general, to signal generators, and, more particularly, to acoustic signal generators.

BACKGROUND ART

Acoustic signal generators have many applications in modern technology. One example of such applications is a Personal Acoustic Alarm System described in copending patent application Ser. No. 348,245, filed on Feb. 12, 1982, now U.S. Pat. No. 4,473,821, the disclosure of which is incorporated herein by reference.

Applications for acoustic signal generators such as the above-mentioned Alarm System require a variety of output signal frequencies. For example, the system disclosed by the referenced patent application requires a plurality of different output signal frequencies in the audio range.

Many acoustic signal generators utilize a Helmholtz resonator having a piezoelectric generator disc associated therewith. These acoustic signal generators include circular metallic discs having a thin layer of piezoelectric material bonded to one side thereof. When an alternating voltage is applied to the piezoelectric material, the resulting mechanical forces distort the disc, causing it to oscillate as a diaphragm. If the disc is driven at a natural fundamental frequency and the Helmholtz resonator associated with that disc is tuned to the same frequency, a high acoustic energy output will occur. Each acoustic signal generator is unique to the disc dimensions and to the signal frequency of interest. Those generators described in the prior art are integral, molded units wherein the casing and the Helmholtz resonators are formed to be a single integral unit. These units, once formed, are intended for use at only one signal frequency and are not intended to be modifiable to produce high-energy signals at frequencies other than the one signal frequency associated with the generator as orignally manufactured and sold. Therefore, if a multiplicity of signal frequencies were of interest to the user, that user had to purchase and have available a corresponding multiplicity of completely separate generator units. This situation is both costly and onerous for the user.

Another disadvantage of known acoustic signal generators is the lack of acoustic signal volume produced. Even though the acoustic generator disc will vibrate symmetrically in two directions, currently known acoustic signal generators have only one Helmholtz resonator per unit. Often only one side of the disc is exposed to the Helmholtz resonator while the other side of the disc is exposed to a casing wall. In such a configuration, those sonic waves directed from the disc toward the casing wall not only are lost, but also may, upon reflection from the wall, actually interfere with the sonic waves directed from the disc toward the Helmholtz resonator. Furthermore, because only one Helmholtz resonator is associated with such signal generator unit, a unit can produce an output signal at only one frequency and in only one direction. Thus, these units must be carefully oriented to generate a signal in the desired direction.

It is apparent from the foregoing that currently known acoustic signal generators are not efficient and cannot make maximum use of the signal producing capability of an acoustic generator disc. For acoustic alarm applications, it is imperative that the acoustic transmitter produce an acoustic signal having as high a volume as possible.

DESCRIPTION OF THE INVENTION

It is a primary object of the present invention to provide a novel and improved acoustic signal generator which is modifiable so the same casing unit can be used to produce a wide variety of acoustic signal frequencies. The signal generator is modular, and a single outer casing unit is combined with a plurality of insert units with the insert units being changed to provide different Helmholtz resonators in the same outer casing unit.

It is another object of the present invention to provide a novel and improved acoustic signal generator having an outer casing unit which includes a plurality of disengageably connected sections so the outer casing unit can be opened and one Helmholtz resonator insert unit can be replaced with another Helmholtz resonator insert unit to change generator output signal frequencies.

It is yet another object of the present invention to provide a novel and improved acoustic signal generator having an outer casing which has at least two holes defined therein so at least two Helmholtz resonators can be provided in the same outer casing unit by a single insert unit. The holes are aligned with each other and can be modified in dimension by the insert unit with the dimensions and shapes of the various elements associated with the casing and insert units being selected in accordance with the requirements of Helmholtz resonator design criteria for each frequency of interest.

It is a further object of the present invention to provide a novel and improved acoustic signal generator which includes a casing adapted to receive interchangeable resonator chamber forming insert units and which utilizes piezoelectric acoustic generator discs which are either edge or nodal mounted on the insert units.

It is yet another object of the present invention to provide a novel and improved acoustic signal generator which is constructed to maximize sound output from the generator. The generator utilizes a piezoelectric acoustic generator disc driven Helmholtz resonator, and the outer casing is symmetric with respect to both sides of the disc so each side of the disc drives an associated Helmholtz resonator. Acoustic signals will be generated from both sides of the disc.

These objects are accomplished by providing a modifiable acoustic signal generator having a separable outer casing unit and a plurality of different insert units usable in that single outer casing unit to change the output signal from one frequency to another frequency. The insert units provide at least a pair of Helmholtz resonators, and a piezoelectric acoustic generator disc is mounted on each insert with a Helmholtz resonator being associated with each side of the disc. Output of the acoustic signal generator is thus maximized.

BEST MODE FOR CARRYING OUT THE INVENTION

Figure 1A:
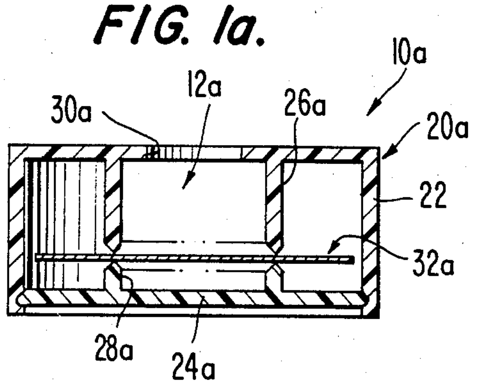
FIG. 1*a* is a sectional elevational view of a prior art acoustical signal generator utilizing a Helmholtz resonator.
Figure 1B:
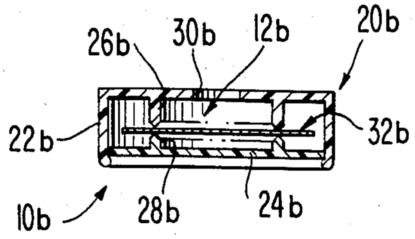
FIG. 1*b* is a sectional elevation view of a prior art acoustical signal generator using a Helmholtz resonator and which produces acoustic signals having a frequency different from those produced by the generator shown in FIG. 1*a;*

Two prior art acoustic generators **10*a* and 10*b*** are shown in FIGS. 1*a* and 1*b*, respectively. The generators **10*a* and 10*b* include Helmholtz resonators 12*a* and 12*b***, respectively, and each generator produces an acoustic signal in a frequency range uniquely and permanently associated with the overall inner and outer geometric dimensions of such prior art generator.

As shown, the generators **10*a* and 10*b*, respectively, include differently dimensioned, unitary outer casings 20*a* and 20*b* with the outer casings including one-piece cover elements 22*a* and 22*b* fixedly coupled to one-piece base elements 24*a* and 24*b* respectively and having openings 30*a* and 30*b* defined therein. The coupling between the casings and bases of these prior art generators is intended to be permanent, and each of the one-piece cover elements includes mounting prongs 26*a* and 26*b* respectively cooperating with mounting prongs 28*a* and 28*b* of the one-piece base elements for mounting acoustic vibration producing means, such as piezoelectric acoustic generator discs 32*a* and 32*b*. The mounted discs cooperate with the unitized casings to define the Helmholtz resonators 12*a* and 12*b* for producing acoustic signals, and each generator is uniquely designed to produce a particular acoustic signal frequency, such as, for example, 3000 Hz for generator 10*a* and 6000 Hz for generator 10*b***.

As discussed above, once assembled, the prior art generators, as represented by the generators **10*a* and 10*b*** are intended to remain permanently assembled and are not intended to be modified. Thus since a particular prior art generator can produce output signals at only one particular frequency, if a plurality of different Helmholtz resonator produced acoustic signal frequencies are required, a plurality of complete generators, including casings, must be obtained with each of the generators being specifically designed to produce one of the desired frequencies.

Figure 2:
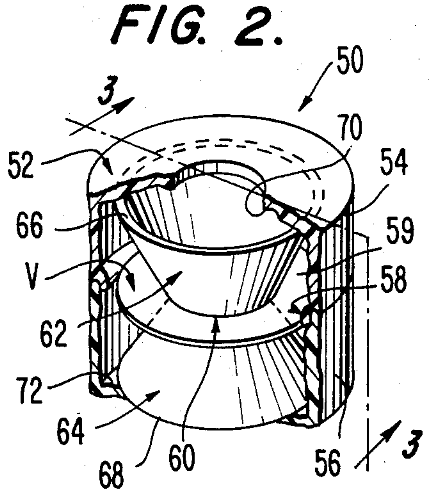
FIG. 2 is a sectional perspective of an acoustic generator embodying the teachings of the present invention.
Figure 3:
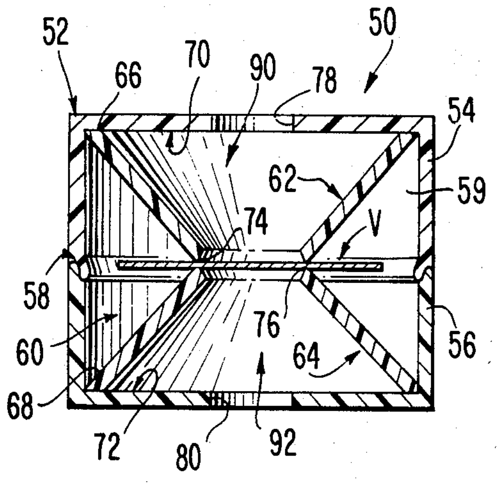
FIG. 3 is a sectional view taken along line 3—3 of FIG. 2.

The present invention provides a single module acoustic generator which, in contrast to the teachings of the prior art, can easily be disassembled and modified so the same outer casing unit can be used in the generation of Helmholtz resonator produced acoustic signals having one or more of a multiplicity of different frequencies. A modular acoustic signal generator embodying the teachings of the present invention indicated generally at 50 is shown in FIGS. 2 and 3, and includes a sectional outer casing unit 52 having separate sections 54 and 56 disengageably coupled together by a detachable coupling means, such as snap joint 58. The sections 54 and 56 may be hinged together or otherwise joined in such a manner that they may be moved apart to provide access to a chamber 59 normally enclosed by the outer casing unit 52.

An insert unit is replacably positioned within the outer casing unit 52 for providing at least one Helmholtz resonator in association with the outer casing unit 52. One or more Helmholtz resonators can be provided by a single modular generator and, if a generator has a plurality of Helmholtz resonators, these resonators can have congruent and equal geometric shapes and can be positioned to produce oppositely directed output signals of the same frequency, or the Helmholtz resonators can be of different geometric shapes dimensions or orientations so that a single acoustic signal generator can be used to produce acoustic signals having different frequencies and directions As shown in FIGS. 2 and 3, a double insert unit 60 is positioned in outer casing unit 52 so the Helmholtz resonators associated with casing unit 52 and double insert unit 60 will produce signals at a selected frequency. The insert unit 60 includes two frusto-conically shaped elements 62 and 64 having respective bases 66 and 68 contacting inner surfaces 70 and 72 of casing sections 54 and 56. Acoustic vibration producing means V is mounted by cooperating edges 74 and 76 of elements 62 and 64, and casing sections 54 and 56 have apertures 78 and 80 defined therein with the structures and apertures being designed, positioned and shaped according to Helmholtz resonator design relationships so that Helmholtz resonators 90 and 92 are defined by the appropriate cooperating structural elements. As shown in FIG. 3, the Helmholtz resonators 90 and 92 are congruent, equal sized, coaxial and oriented with respect to each other so that symmetric vibration of acoustic vibration producing means V produces identical oppositely directed signals from both resonators and utilizes both sides of the acoustic vibration producing means, thereby increasing the efficiency and the versatility of the generator. The vibration producing means may be formed by known ceramic metal resonant disc devices of the Murata Erie type, PKM 28-3AD. The circular metal disc has a thin layer of piezoelectric material bonded to it on one side, and when an electric driving signal is applied to the piezoelectric element, the distortion of the element due to the magnetostrictive effect will cause the disc to oscillate as a diaphragm. This oscillation has been found to be substantially symmetrical.

Figure 4:
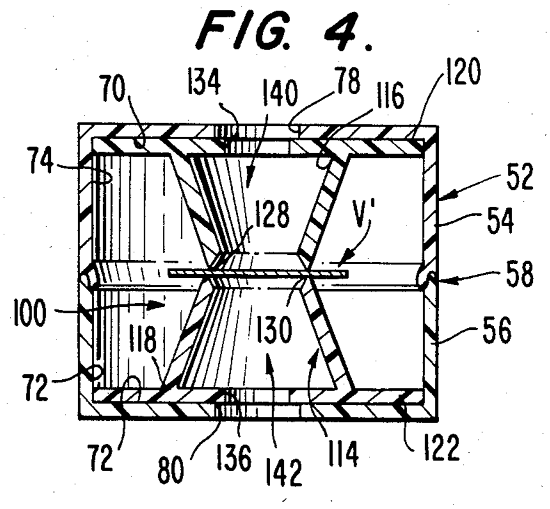
FIG. 4 is a sectional view similar to that of FIG. 3 and showing the acoustic generator embodying the teachings of the present invention modified to produce acoustic signals having frequencies different from those frequencies associated with the generator shown in FIG. 3.

As shown in FIG. 4, an insert 100 is positioned in outer casing unit 52 so that Helmholtz resonator, or resonators, associated with casing unit 52 and insert unit 100 will produce an output signal or signals at a frequency different from the output signal frequency associated with the same casing unit 52 using insert unit 60. The insert unit 100 includes two one-piece frustoconically shaped elements 112 and 114 having respective bases 116 and 118 integral with webs 120 and 122, with the webs 120 and 122 contacting inner surfaces 70 and 72 of the casing sections 54 and 56. Acoustic vibration producing means V' is mounted by cooperating edges 128 and 130 of the elements 112 and 114, and the webs are sized and shaped to define appropriately dimensioned apertures 134 and 136 so that Helmholtz resonators 140 and 142 are defined by the appropriate cooperating structural elements having dimensions and orientations determined according to Helmholtz resonator design relationships to produce the desired acoustic output signals.

As an illustration of the versatility of the device embodying the teaching of the present disclosure, a generator including outer casing unit 52 and insert unit 60 can be used to produce acoustic signals having a frequency of about 3000 Hz and a generator including the same outer casing unit 52 and insert unit 100 can be used to produce acoustic signals having a frequency of about 6000 Hz. Thus the same outer casing unit can be associated with a multiplicity of different Helmholtz resonators. One resonator is easily replaced by another by opening the casing unit 52 and substituting a new insert unit for the previously used insert unit. This simple procedure is contrasted with the requirement of replacing the entire generator 10*a* with a totally different generator 10*b* to change the frequency of prior art Helmholtz resonators.

Preferably, the insert unit is injection molded and the acoustic vibration producing means is a piezoelectric acoustic generator disc which is edge or nodel mounted by the appropriate insert unit structural element.

While the modular acoustic signal generator 50 embodying the teachings of the present disclosure has been described as being symmetric and having two Helmholtz resonators dimensioned to produce the same frequency, it is also possible, with the present invention, for a generator to have two Helmholtz resonators of a different size to produce a different frequency from each side of the generator. To accomplish this, the disc V would be a dual frequency disc. Each disc will have a fundamental resonance frequency and will have super-and subharmonic frequencies at which it exhibits resonant responses generally less pronounced than the fundamental resonance. One of the harmonic frequencies can be used as the second frequency. The top Helmholtz resonator insert in the casing would be dimensioned to provide one of the disc frequencies while a second insert at the bottom of the casing would be dimensioned to provide the second disc frequency. Thus the casing might include a large top insert, such as the insert 62, combined with a smaller bottom insert, such as the insert 118 to support a disc V.

The inserts 60 and 100 may be formed to any shape required to form the desired Helmholtz resonator, and they need not always be of the frusto conical configuration illustrated in FIGS. 2 and 3. The insensitivity of the cavity shape factor and the inverse relationship between the cavity volume and the aperture of the opening in a Helmholtz resonator provide the flexibility in the design of the insert.

Industrial Applicability

The general purpose modular acoustic generator 50 may be effectively employed to provide an acoustic signal in either the audio or ultrasonic frequency range which is of greater amplitude than the signals produced by generators having only a single resonant chamber. The frequency produced by the acoustic generator may be easily altered by substituting new inserts for those previously used to alter the dimensions of the resonant chamber and, in most cases, substituting a new disc V.

We claim:

1. A general purpose modular acoustic generator comprising:

a separable outer casing unit which includes a plurality of separate hollow casing sections and coupling means for detachably securing said hollow casing sections together in a manner defining a chamber;

an insert unit removably positioned in said chamber of the outer casing unit; and an acoustic vibration producing means removably mounted within said chamber of the outer casing unit;

said outer casing unit being provided with at least one aperture that is positioned in coordination with the position of said insert unit in a manner creating at least one Helmholtz resonator; said insert unit having a tubular section, one open end of which provides support for the acoustic vibration producing means and an opposite end of which surrounds said aperture; and said acoustic vibration producing means being supported within the chamber by said insert unit in a manner for producing a selected output frequency from the acoustic generator.

2. The general purpose modular acoustic generator defined in claim 1 wherein said insert unit includes means for defining a plurality of Helmholtz resonators.

3. The general purpose modular acoustic generator defined in claim 2 wherein said plurality of Helmholtz resonators are congruent and defined in axially aligned pairs.

4. The general purpose modular acoustic generator defined in claim 1 wherein said Helmholtz resonator includes a conically shaped section.

5. The general purpose modular acoustic generator defined in claim 1 wherein said coupling means includes a snap joint.

6. The general purpose modular acoustic generator defined in claim 1 wherein said acoustic vibration producing means includes a piezoelectric acoustic generator disc.

7. The general purpose modular acoustic generator defined in claim 6 wherein said acoustic generator disc is nodal mounted.

8. The general purpose modular acoustic generator defined in claim 6 wherein said insert unit includes means for defining a Helmholtz resonator on each side of said piezoelectric acoustic generator disc.

9. The general purpose acoustic generator defined in claim 1, wherein the tubular section is conically shaped.

10. The general purpose acoustic generator defined in claim 1, wherein said casing unit has an aperture in each of opnositely facing walls thereof and said insert unit has a pair of axially aligned tubular sections, each of which has an open end which surrounds and a respective said aperture, and wherein said acoustic vibration producing means is supported at edges defining open opposite ends of the tubular sections.

11. The general purpose acoustic generator defined in claim 10, wherein each said tubular section is conically shaped.

12. The general purpose acoustic generator defined in claim 11, wherein both tubular sections have the same size and shape for enabling production of oppositely directed output signals of the same frequency.

13. The general purpose acoustic generator defined in claim 10, wherein both tubular sections have the same size and shape for enabling production of oppositely directed output signals of the same frequency.

14. The general purpose acoustic generator defined in claim 10, wherein said insert unit is one of a plurality of insert units removably and interchangeably positionable in said chamber, each of said insert units being operable for creating Helmholtz resonators which will produce a selected one of a plurality of different output frequency characteristics from the acoustic generator.

15. The general purpose acoustic generator defined in claim 1, wherein said insert unit is one of a plurality of insert units removably and interchangeably positionable in said chamber, each of said insert units being operable for creating a Helmholtz resonator which will produce a selected one of a plurality of different output frequency characeristics from the acoustic generator.

* * * * *